US012801076B2

(12) United States Patent
Takifuji

(10) Patent No.: US 12,801,076 B2
(45) Date of Patent: Nov. 17, 2026

(54) IMAGE FORMING APPARATUS

(71) Applicant: BROTHER KOGYO KABUSHIKI KAISHA, Nagoya (JP)

(72) Inventor: Kotaro Takifuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/022,818

(22) Filed: Jan. 15, 2025

(65) Prior Publication Data

US 2025/0298361 A1 Sep. 25, 2025

(30) Foreign Application Priority Data

Mar. 20, 2024 (JP) ................................ 2024-044286

(51) Int. Cl.
*G03G 21/16* (2006.01)
*G03G 15/00* (2006.01)

(52) U.S. Cl.
CPC ......... *G03G 15/80* (2013.01); *G03G 21/1619* (2013.01); *G03G 21/1652* (2013.01)

(58) Field of Classification Search
CPC . G03G 21/1619; G03G 15/80; G03G 21/1652
See application file for complete search history.

(56) References Cited

U.S. PATENT DOCUMENTS

2003/0107625 A1* 6/2003 Koga ..................... B41J 19/005 347/85
2005/0062836 A1* 3/2005 Nakajima ............ G03G 15/011 347/225
2007/0160382 A1* 7/2007 Tomatsu ............ G03G 21/1619 399/121
2007/0230988 A1 10/2007 Nobe et al.
2009/0323147 A1* 12/2009 Amada ................ G03G 15/326 359/205.1
2010/0014887 A1* 1/2010 Tomatsu ............ G03G 21/1864 399/107
2011/0235139 A1* 9/2011 Kurokawa ............. G03G 15/60 358/498
2011/0235140 A1* 9/2011 Ito ........................ H04N 1/2307 358/498
2014/0056612 A1* 2/2014 Mori .................. G03G 21/1628 399/110
2015/0213923 A1* 7/2015 Yoshino ............. G03G 21/1652 174/105 R (Continued)

FOREIGN PATENT DOCUMENTS

JP 2003-348740 A 12/2003
JP 2007-261154 A 10/2007

*Primary Examiner* — Sevan A Aydin
(74) *Attorney, Agent, or Firm* — Merchant & Gould P.C.

(57) ABSTRACT

An image forming apparatus includes paired main-body frames, a scanner frame, a scanner cover plate, a first board arranged on one of the paired main-body frames, a second board arranged on the other of the paired main-body frames, a first flat cable, and a second flat cable. The first flat cable and the second flat cable are connected to the first board in a state overlapping each other and connected to the second board in a state aligning side by side. A length of a portion where the first flat cable and the second flat cable overlap each other is smaller than a length of a portion where the first flat cable and the second flat cable align side by side.

5 Claims, 7 Drawing Sheets

(56) References Cited

U.S. PATENT DOCUMENTS

| | | | | |
|---|---|---|---|---|
| 2016/0109848 | A1* | 4/2016 | Ohata | G03G 21/1619<br>399/107 |
| 2019/0041782 | A1* | 2/2019 | Nishikawa | G03G 15/2053 |
| 2019/0326035 | A1* | 10/2019 | Akagi | H01B 7/041 |
| 2020/0310327 | A1* | 10/2020 | Kanno | G03G 21/1619 |
| 2022/0365474 | A1* | 11/2022 | Kawasumi | G03G 21/1619 |
| 2025/0108645 | A1* | 4/2025 | Hara | B41J 29/02 |

* cited by examiner

IMAGE FORMING APPARATUS

REFERENCE TO RELATED APPLICATIONS

This application claims priority from Japanese Patent Application No. 2024-044286, filed on Mar. 20, 2024. The entire content of the priority application is incorporated herein by reference.

BACKGROUND ART

A connecting means for connecting electric devices, formed of flat flexible cables that are laid to partly overlap one another, is known.

SUMMARY

It is known that currents flowing in the cables are more likely to be mixed with noise currents as a length of the portion where the cables overlap each other is greater. However, concerning the known connecting means, a length of the overlapping portion of the connecting means is not specified, or reduction of the noise currents by reducing the length of the overlapping portion of the flat flexible cables is not considered.

The present disclosure relates to a technique that may reduce noise currents to be mixed with currents flowing in cables by reducing a length of overlapping portion of the cables.

According to an aspect of the present disclosure, an image forming apparatus includes paired main-body frames, a scanner frame, a scanner cover plate, a first board, a second board, a first flat cable, and a second flat cable. The paired main-body frame form side walls of a main body that face each other. The scanner frame, on which an exposure device for irradiating a photosensitive drum is mounted, is connected to one of the paired main-body frames and the other of the paired main-body frames at a position between the one of the paired main-body frames and the other of the paired main-body frames. The scanner cover plate covers an entirety of the scanner frame on which the exposure device is mounted. The first board is arranged on the one of the paired main-body frames. The second board is arranged on the other of the paired main-body frames. The first flat cable having flexibility extends over the scanner cover plate and connects the first board and the second board. The second flat cable having flexibility extends over the scanner cover plate and connects the first board and the second board. The first flat cable and the second flat cable are connected to the first board in a state overlapping each other and connected to the second board in a state aligning side by side. A length of a portion where the first flat cable and the second flat cable overlap each other is smaller than a length of a portion where the first flat cable and the second flat cable align side by side.

DESCRIPTION

Hereinbelow, an embodiment of the present disclosure will be described with reference to the accompanying drawings. In the accompanying drawings referred to below, some of basic components in a color laser printer 1 may be omitted, and dimensional ratios of the depicted components may not necessarily correspond to those in actual life-size. Bidirectional arrows D1, D2, D3 in FIGS. 1-7 indicate a front-rear direction, an up-down direction, and a right-left direction, respectively, within the color laser printer 1.

Figure 1:
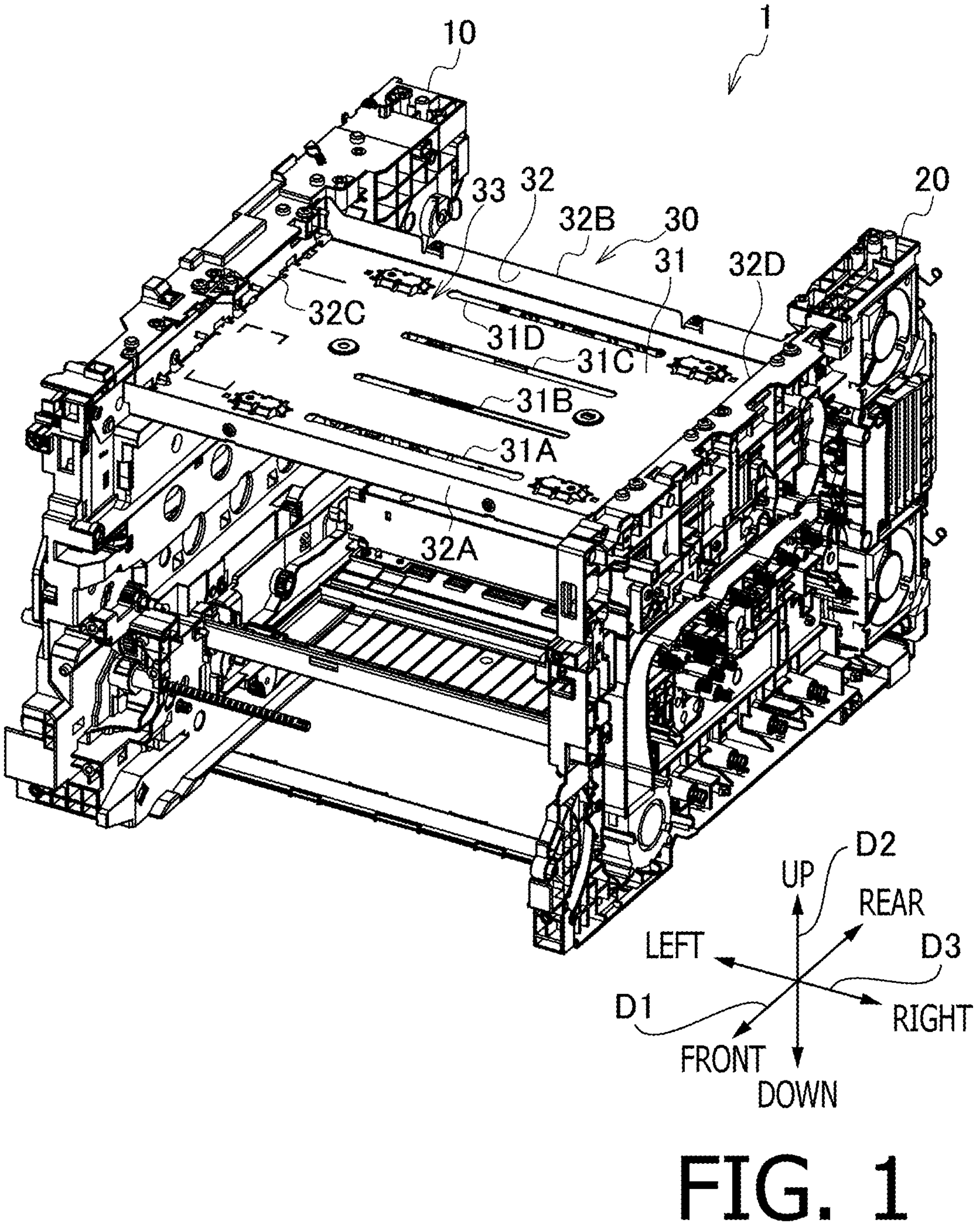
FIG. 1 is a perspective view of inner frames of a color laser printer.

FIG. 1 is a perspective view of inner frames in the color laser printer 1. The color laser printer 1 is an example of the image forming apparatus according to the embodiment of the present disclosure. In the description below, the color laser printer 1 may simply be referred to as a printer 1. As shown in FIG. 1, in the printer 1, a pair of main-body frames 10, 20, which form side walls of a main body, stand to face each other. One of the paired main-body frames 10, 20 forming a leftward side wall will be herein referred to as a leftward body frame 10, and the other of the paired main-body frames 10, 20 forming a rightward side wall will be herein referred to as a rightward body frame 20. The leftward body frame 10 is an example of the one of the paired main-body frames, and the rightward body frame 20 is an example of the other of the paired main-body frames. Both the leftward body frame 10 and the rightward body frame 20 may be formed of, for example, resin.

The printer 1 includes a scanner frame 30 connected to the leftward body frame 10 and the rightward body frame 20 at a position between the leftward body frame 10 and the rightward body frame 20. On the scanner frame 30, an exposure device (not shown) for irradiating four photosensitive drums (not shown) is mounted. The photosensitive drums may correspond to four colors of, for example, yellow, magenta, cyan, and black on one-to-one basis. The scanner frame 30 includes a bottom surface 31 and side surfaces 32 forming a top-open box with an upward surface 33 being exposed. The bottom surface 31 extends in a rectangular shape between the leftward body frame 10 and the rightward body frame 20, and the side surfaces 32 surrounds the bottom surface 31. The side surfaces 32 include a frontward surface 32A, a rearward surface 32B, a leftward surface 32C, and a rightward surface 32D.

The scanner frame 30 is fixed to the leftward body frame 10 and the rightward body frame 20 by the leftward surface 32C being screwed to the leftward body frame 10 and the rightward surface 32D being screwed to the leftward body frame 10.

On the bottom surface 31 of the scanner frame 30, four slits 31A-31D are formed. The exposure device mounted on the scanner frame 30 may emit light beams at the photosensitive drums located below the bottom surface 31 through the slits 31A-31D to irradiate surfaces of the photosensitive drums.

Figure 2:
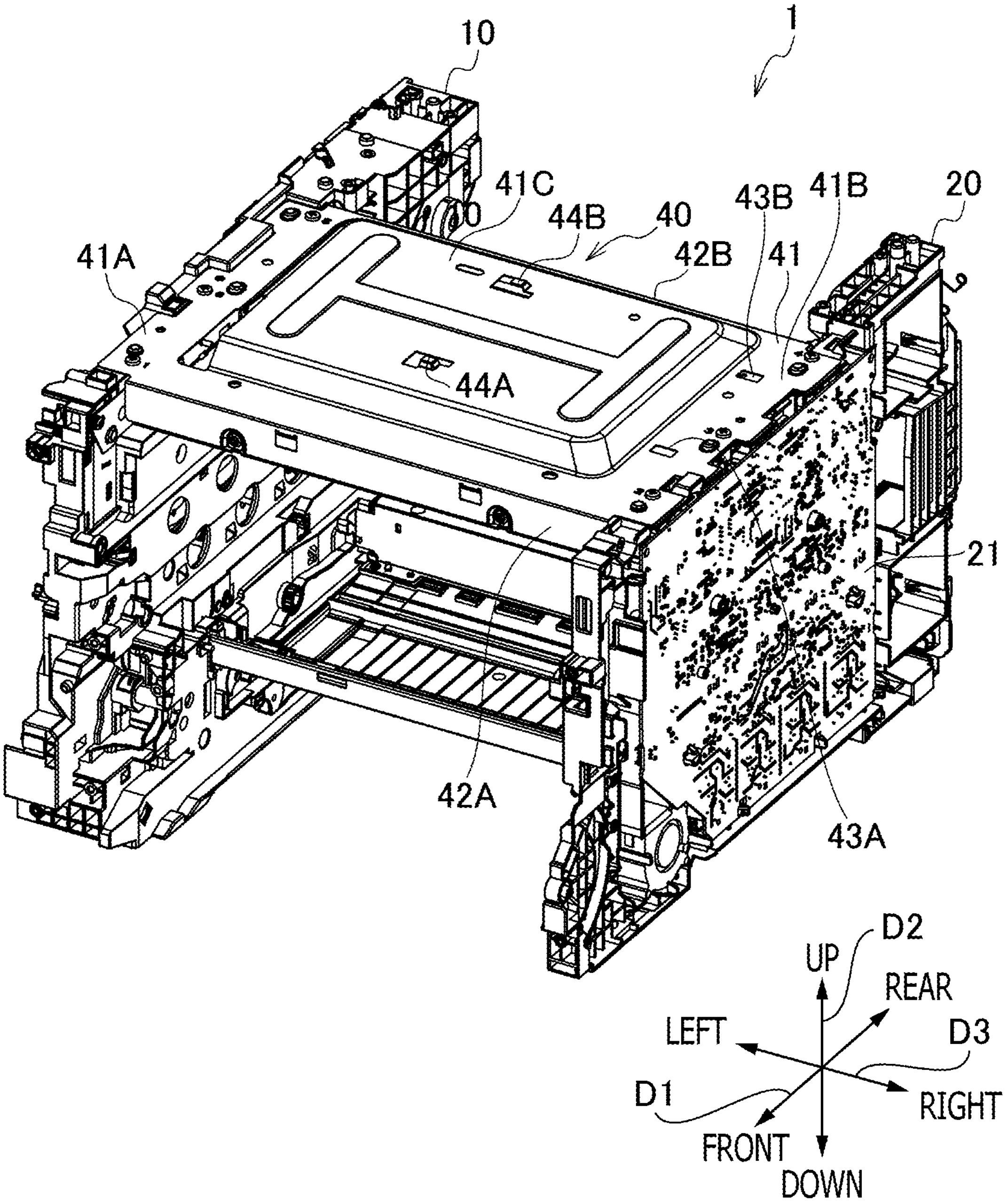
FIG. 2 is a perspective view of a scanner cover plate attached to a scanner frame.

FIG. 2 shows a scanner cover plate 40 attached to the scanner frame 30 shown in FIG. 1. The scanner cover plate 40 covers an entirety of the scanner frame 30, on which the exposure device is mounted. The scanner cover plate 40 is formed of an upper surface 41 including an elevated portion 41C in a shape of a rectangular frustum, a frontward surface 42C extending downward from a frontward edge of the upper surface 41, and a rearward surface 42B extending downward from a rearward edge of the upper surface 41. The scanner cover plate 40 is open leftward, rightward, and downward. The scanner cover plate 40 is fixed to the scanner frame 30 by the frontward surface 42A screwed to the frontward surface 32A and the rearward surface 42B screwed to the rearward surface 32B. Further, the scanner cover plate 40 is fixed to the leftward body frame 10 by a leftward edge portion 41A of the upper surface 41 screwed to the leftward body frame 10 and to the rightward body frame 20 by a rightward edge portion 41B of the upper surface 41 screwed to the rightward body frame 20.

Figure 3:
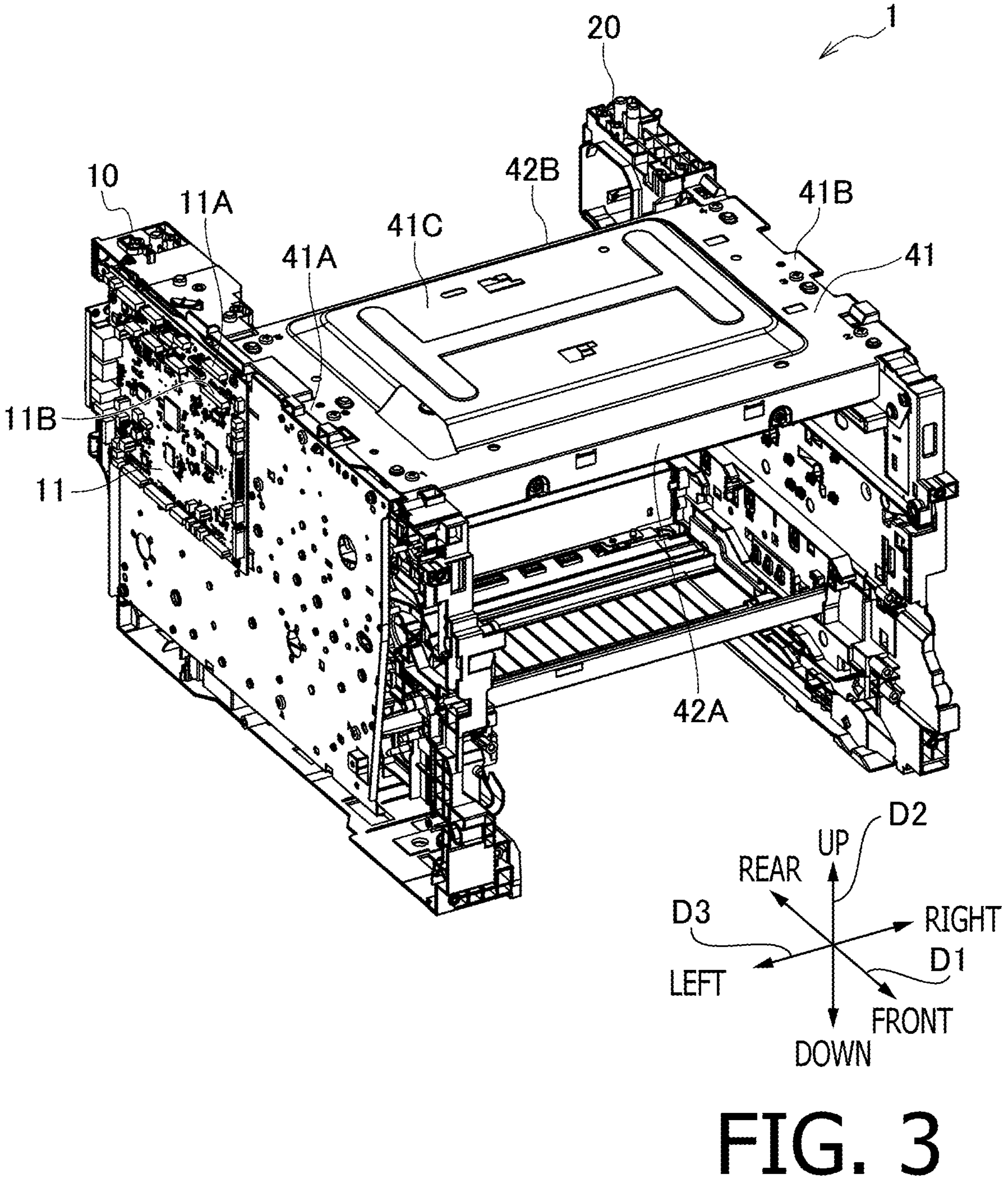
FIG. 3 is another perspective view of the scanner cover plate attached to the scanner frame.

FIG. 3 is another perspective view of the inner frames of the printer 1 viewed from a viewpoint different from the viewpoint in FIG. 2, in particular, from a leftward-front position. As shown in FIG. 3, on a leftward surface of the leftward body frame 10, a main board 11 is arranged. On the main board 11, an ASIC (not shown) for controlling overall operations of the printer 1 is mounted. The main board 11 is an example of the first board.

On the other hand, as shown in FIG. 2, on a rightward surface of the rightward body frame 20, a high-voltage power board 21 is arranged. The high-voltage power board 21 may supply high voltages such as a developing voltage and a charging voltage to a process unit (not shown), including the photosensitive drums and the exposure device, for forming an image on a sheet. On the high-voltage power board 21, electric devices for controlling a fuser (not shown) are mounted. The fuser may fuse a toner image transferred to a sheet and fix thereon. The printer 1 according to the present disclosure is configured such that the fuser is replaceable by a user. In contrast, in the past, printers may have been configured such that the fuser is non-replaceable, and a fuser board, on which the electric devices for controlling the fuser are mounted, may have been located on a side of the main board 11. However, due to the structural change with the replaceable fuser, it has become difficult to locate the fuser board on the side of the main board 11. Accordingly, printers with the electric devices for controlling the fuser being mounted on the high-voltage power board 21 have been provided since then. While the former type of the printer having the non-replaceable fuser required a single flat cable between the main board 11 and the high-voltage power board 21 for the control over the fuser, the printer 1 according to the present embodiment requires two flat cables for connection with the main board 11: one for the high-voltage control and one for the fuser control. Therefore, on the main board 11 as shown in FIG. 3, (female) connectors 11A, 11B, to which (male) connectors 61A, 62A (see FIG. 7) are connectable, are mounted. The connectors 61A, 62A are each provided at respective ends of the two flat cables. The high-voltage power board 21 is an example of the second board.

Figure 4:
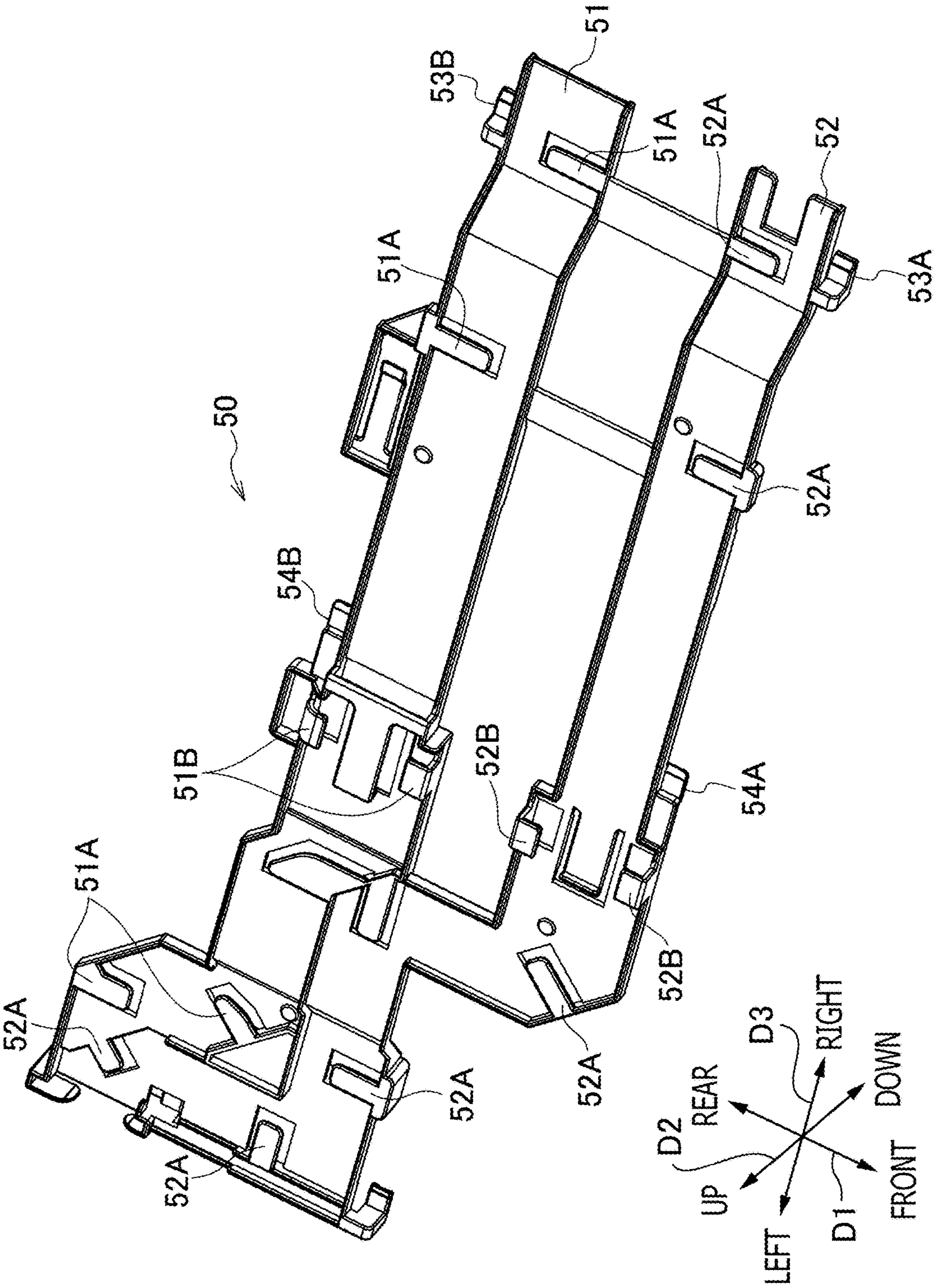
FIG. 4 is a perspective view of a holder for retaining flat cables.

FIG. 4 illustrates a holder 50 for retaining the two flat cables. The holder 50 is, as will be described further below with reference to FIGS. 5 and 6, located on the scanner cover plate 40. As shown in FIG. 4, the holder 50 includes two grooves, i.e., a first groove 51 and a second groove 52, in which the two flat cables are retained in a layout such that the two flat cables lie side by side in parallel to each other on one end and overlap each other vertically on the other end. In other words, the two flat cables retained by the holder 50 are extended to shift from a state where the two flat cables lie side by side to a state where the two flat cables overlap each other, or shift from a state where the two flat cables overlap each other to a state where the two flat cables lie side by side. One of the flat cables retained in the first groove 51 will be herein called a first flat cable 61 (see FIG. 5), and the other of the flat cables retained in the second groove 52 will be herein called a second flat cable 62 (see FIG. 5).

In the first groove 51, a plurality of first retaining claws 51A for retaining the first flat cable 61 within the first groove 51 are formed. Further, in the first groove 51, two (2) second retaining claws 51B for retaining a first ferrite core 71 (see FIG. 5) are formed. The first ferrite core 71 may cover a part of the first flat cable 61 in a state where the first flat cable 61 is retained in the first groove 51.

Similarly, in the second groove 52, a plurality of second retaining claws 52A for retaining the second flat cable 62 within the second groove 52 are formed. In the second groove 52, two (2) second retaining claws 52B for retaining a second ferrite core 72 (see FIG. 5) are formed. The second ferrite core 72 may cover a part of the second flat cable 62 in a state where the second flat cable 62 is retained in the second groove 52.

The first groove 51 is formed substantially linearly from a rightward end thereof, i.e., an end closer to the high-voltage power board 21, to a leftward end thereof, i.e., an end closer to the main board 11, climbing up and down along the elevated surface of the scanner cover plate 40. In contrast, the second groove 52 is formed linearly from a rightward end thereof to a position where the second retaining claws 52B are formed, extends rear-leftward toward the first groove 51, and overlaps the first groove 51 vertically at a leftward end portion thereof. The first groove 51 and the second groove 52 are formed in this manner due to a cause such that, on the rightward ends, the first flat cable 61 and the second flat cable 62 are laid in parallel to each other to be connected to the respective mating connectors (not shown) that align side-by-side on the high-voltage power board 21, and on the leftward ends, the first flat cable 61 and the second flat cable 62 are laid to overlap each other to be connected to the respective mating connectors (female) 11A, 11B that align one on top the other on the main board 11. A length of the portion where the first flat cable 61 and the second flat cable 62 align side by side is greater than a length of the portion where the first flat cable 61 and the second flat cable 62 overlap each other. In this arrangement, by reducing the overlapping length of the first flat cable 61 and the second flat cable 62, noise currents may be reduced.

Moreover, at rearward and adjacent positions with respect to the first groove 51, two engageable claws 53B, 54B are formed, and at frontward and adjacent positions with respect to the second groove 52, two engageable claws 53A, 54A are formed. The engageable claws 53A, 54A are engaged with engageable holes 43A, 44A, respectively, which are formed on the upper surface 41 and the elevated portion 41C of the scanner cover plate 40. The engageable claws 53B, 54B are engaged with engageable holes 43B, 44B, respectively, which are formed on the upper surface 41 and the elevated portion 41C of the scanner cover plate 40. Thereby, the holder 50 is fixed to the scanner cover plate 40.

Figure 5:
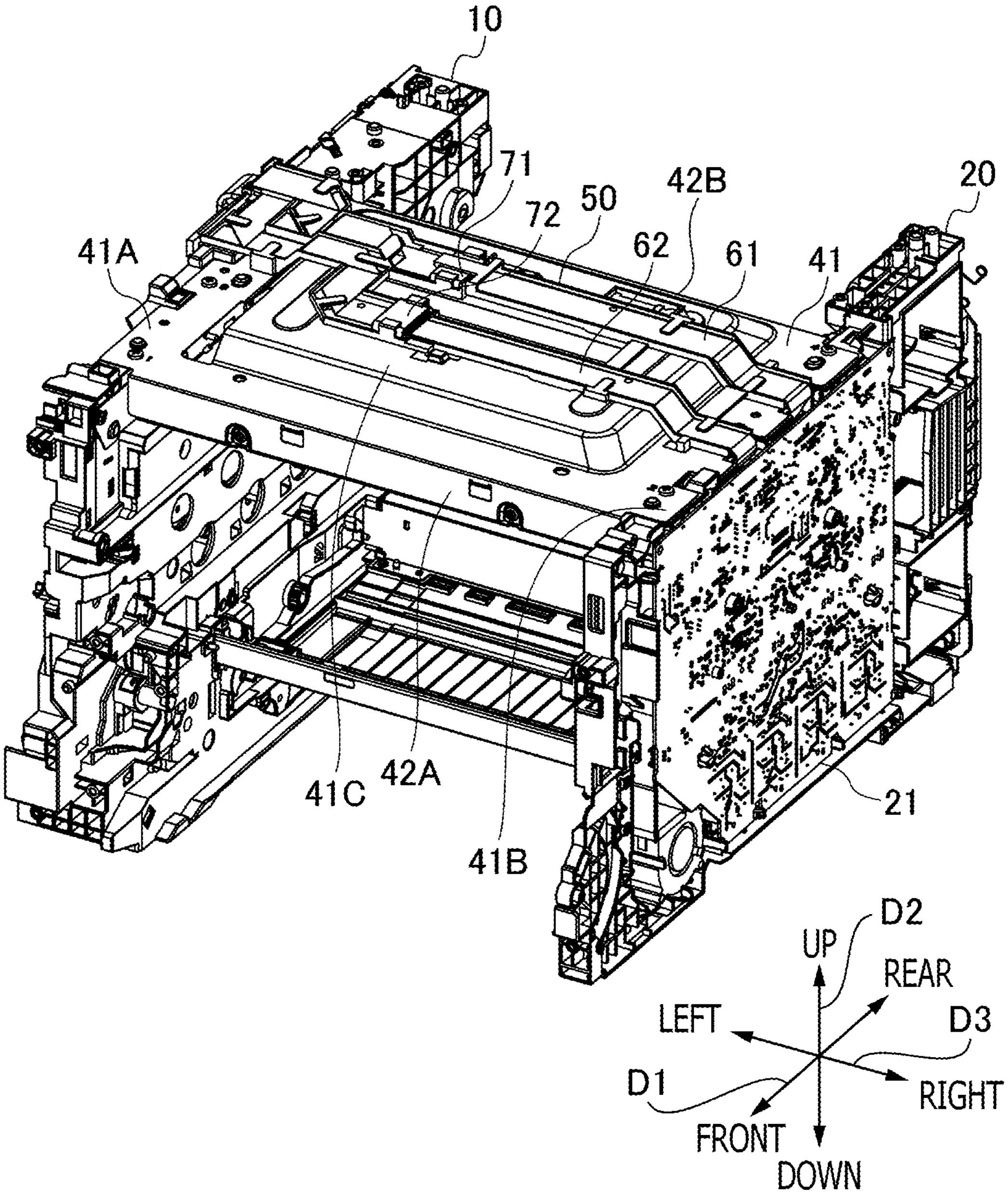
FIG. 5 is a perspective view of the holder retaining the flat cables and set on the scanner cover plate.
Figure 6:
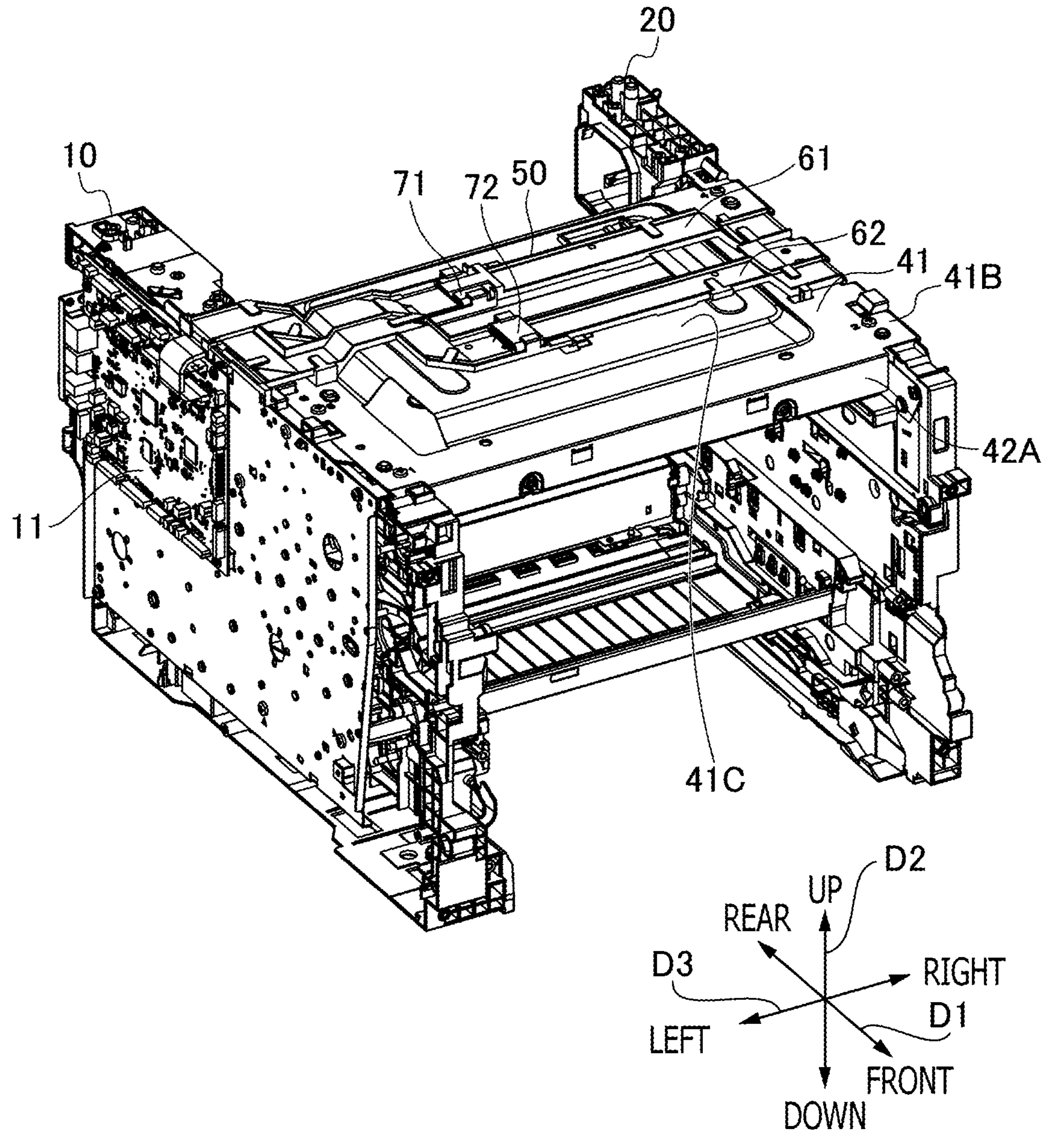
FIG. 6 is another perspective view of the holder retaining the flat cables and set on the scanner cover plate.

FIGS. 5 and 6 show the holder 50 fixed to the scanner cover plate 40 and the first flat cable 61 and the second flat cable 62 retained by the holder 50. FIG. 5 is a perspective view from a rightward-front viewpoint, and FIG. 6 is a perspective view from a leftward-front viewpoint. The holder 50 is fixed to the scanner cover plate 40 in this manner for a reason such that, by arranging the first flat cable 61 and the second flat cable 62 in parallel to each other in a most part of a larger area on the scanner cover plate 40, the noise currents that may otherwise be mixed with the currents flowing in the first flat cable 61 and the second flat cable 62 may be reduced.

The second flat cable 62 is laid in the holder 50 along the second groove 52, extending linearly from the rightward end of the second groove 52 to the position where the second ferrite core 72 is retained, turning by bending once to extend in the front-rear direction, and turning by bending once to extend again in the widthwise direction, turning by further bending once to extend again in the front-rear direction, and turning by bending furthermore once to extend again in the widthwise direction to overlap the first flat cable 61. At the portion where the first flat cable 61 and the second flat cable 62 overlap, a sheet-shaped sponge 75 to reserve a predetermined amount of gap is interposed between the first flat cable 61 and the second flat cable 62. The sponge 75 is an example of the distance-reserving member.

The first ferrite core 71 and the second ferrite core 72 are, as shown in FIGS. 5 and 6, located in the portion where the first flat cable 61 and the second flat cable 62 align side by side, at positions in proximity to the portion where the first flat cable 61 and the second flat cable 62 overlap each other. By arranging the first ferrite core 71 and the second ferrite core 72 at these positions in proximity to the portion, in which the first flat cable 61 and the second flat cable 62 overlap each other, where the currents may likely to be mixed with the noise currents, the noise currents may be reduced more effectively.

Figure 7:
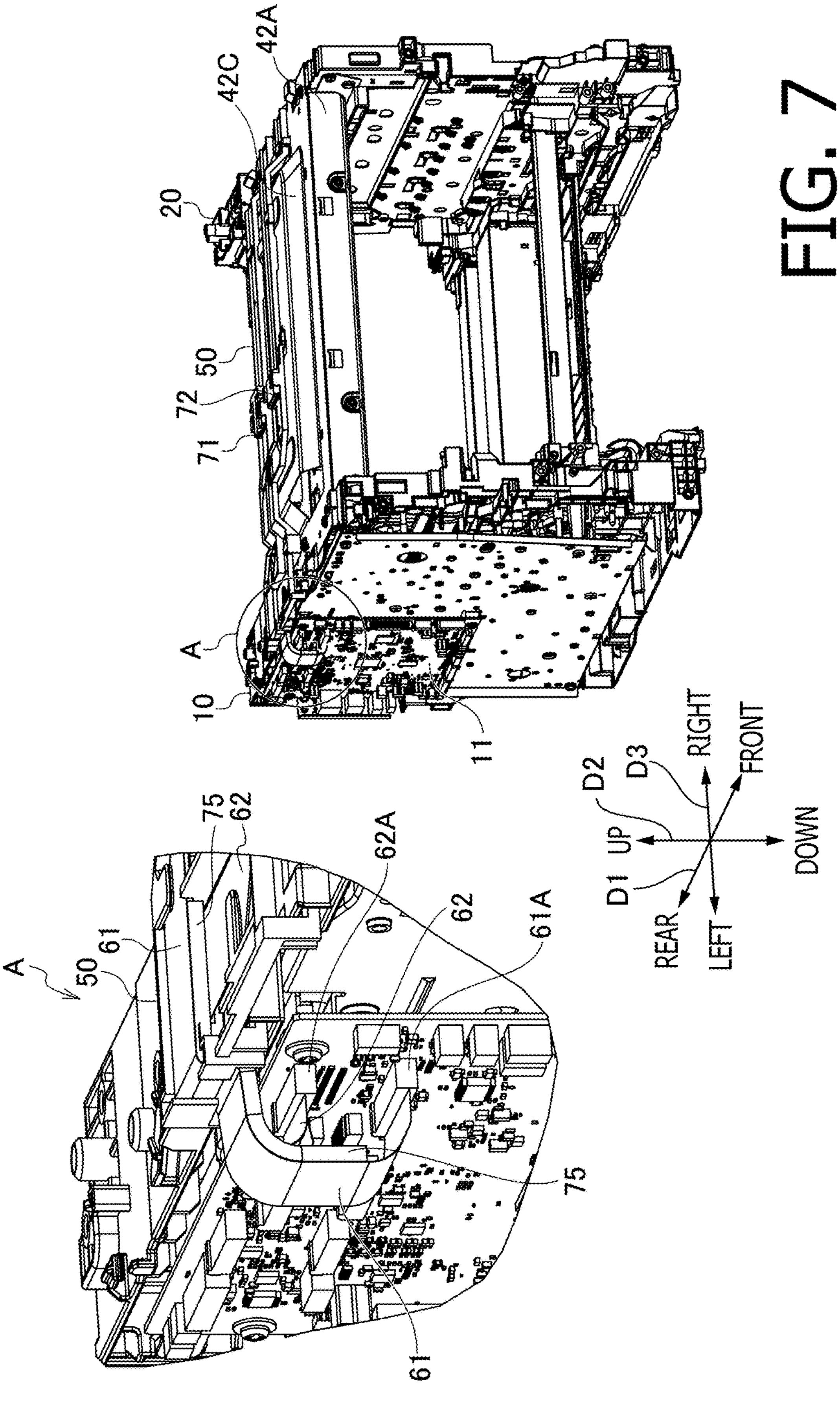
FIG. 7 is a perspective view and an enlarged view of an area A of the inner frames of the color laser printer.

FIG. 7 illustrates the first flat cable 61 and the second flat cable 62 overlapping each other with the sponge 75 interposed there-between. FIG. 7 includes an enlarged view of an area A. As shown in FIG. 7, the sponge 75 interposed between the first flat cable 61 and the second flat cable 62 in the range where the first flat cable 61 and the second flat cable 62 overlap each other is extended to a position in the proximity to the connector 61A located at the end of the first flat cable 61. The sponge 75 may be, for example, adhered to an inner surface of the first flat cable 61 with a double-sided adhesive tape. As such, the sponge 75 interposed in the overlapping portion between the first flat cable 61 and the second flat cable 62 may separate the first flat cable 61 and the second flat cable 62 from each other as far as possible, thereby the noise currents to be mixed with the currents flowing in the first flat cable 61 and the second flat cable 62 may be reduced effectively.

As described above, the printer 1 according to the present disclosure includes the paired main-body frames 10, 20, the scanner frame 30, the scanner cover plate 40, the main board 11, the high-voltage power board 21, the first flat cable 61, and the second flat cable 62. The paired main-body frames 10, 20 form side walls of the main body that face each other. The scanner frame 30, on which the exposure device for irradiating the photosensitive drums is mounted, is connected to the leftward body frame 10 being the one of the paired main-body frames 10, 20 and the rightward body frame 20 being the other of the paired main-body frames 10, 20 at the position between the leftward body frame 10 and the rightward body frame 20. The scanner cover plate 40 covers the entirety of the scanner frame 30 on which the exposure device is mounted. The main board 11 is arranged on the leftward body frame 10. The high-voltage power board 21 is arranged on the rightward body frame 20. The first flat cable 61 having flexibility extends over the scanner cover plate 40 and connects the main board 11 and the high-voltage power board 21. The second flat cable 62 having flexibility extends over the scanner cover plate 40 and connects the main board 11 and the high-voltage power board 21. The first flat cable 61 and the second flat cable 62 are connected to the main board 11 in the state overlapping each other and connected to the high-voltage power board 21 in the state aligning side by side. The length of the portion where the first flat cable 61 and the second flat cable 62 overlap each other is smaller than the length of the portion where the first flat cable 61 and the second flat cable 62 align side by side.

As such, in the printer 1 according to the present disclosure, the first flat cable 61 and the second flat cable 62 are laid to align side by side in the most part of the relatively large area on the scanner cover plate 40; therefore, noise currents that may be mixed with the current flowing in the first flat cable 61 or the current flowing in the second flat cable 62 may be reduced. Moreover, the first flat cable 61 and the second flat cable 62 overlap each other to be connected to the main board 11. As such, the first flat cable 61 and the second flat cable 62 may be collectively disposed in a compact layout.

Moreover, the first flat cable 61 and the second flat cable 62 shift from the state overlapping each other to the state aligning side by side by at least one of the first flat cable 61 or the second flat cable 62 bending at least twice. As such, in the simple arrangement where at least one of the first flat cable 61 or the second flat cable 62 is bent at least twice, the first flat cable 61 and the second flat cable 62 are shifted from the overlapping state to the side-by-side state.

Moreover, the printer 1 includes the holder 50 configured to retain the first flat cable 61 and the second flat cable 62. The scanner cover plate 40 includes the plurality of engageable holes 43A, 43B, 44A, 44B, and the holder 50 includes the plurality of engageable claws 53A, 53B, 54A, 54B respectively engageable with the plurality of engageable holes 43A, 43B, 44A, 44B. The holder 50 is fixed to the scanner cover plate 40 by the plurality of engageable claws 53A, 53B, 54A, 54B engaged with the plurality of engageable holes 43A, 43B, 44A, 44B. As such, by the engagement between the engageable claws 53A, 53B, 54A, 54B of the holder 50 and the engageable holes 43A, 43B, 44A, 44B in the scanner cover plate 40, the holder 50 is fixed to the scanner cover plate 40. Moreover, through the engageable holes 43A, 43B, 44A, 44B formed in the scanner cover plate 40, heat generated by the exposure device inside the scanner frame 30 covered by the scanner cover plate 40 may be released outside.

Moreover, the printer 1 includes at least two ferrite cores, the first ferrite core 71 and the second ferrite core 72, configured to cover a part of the first flat cable 61 and a part of the second flat cable 62, respectively. The first ferrite core 71 and the second ferrite core 72 are located in the portion where the first flat cable 61 and the second flat cable 62 align side by side, at positions in proximity to the portion where the first flat cable 61 and the second flat cable 62 overlap each other. As such, the first ferrite core 71 and the second ferrite core 72 are located in the portion where the first flat cable 61 and the second flat cable 62 align side by side, at positions in the proximity to the portion where the first flat cable 61 and the second flat cable 62 overlap each other. In other words, the first ferrite core 71 and the second ferrite core 72 are located at positions in the proximity to the portion where the first flat cable 61 and the second flat cable 62 overlap each other, where the noise currents are likely to be mixed with the currents flowing in the first flat cable 61 and the second flat cable 62. Therefore, the noise currents that may otherwise be mixed with the currents flowing in the first flat cable 61 and the second flat cable 62 may be reduced effectively.

Moreover, the printer 1 further includes the sponge 75 to form a predetermined amount of gap between the first flat cable 61 and the second flat cable 62 in the portion where the first flat cable 61 and the second flat cable 62 overlap each other. As such, in the portion where the first flat cable 61 and the second flat cable 62 overlap each other, the predetermined amount of gap is reserved with the sponge 75 interposed between the first flat cable 61 and the second flat cable 62. Therefore, the noise currents that may otherwise be mixed with the currents flowing in the first flat cable 61 and the second flat cable 62 may be reduced effectively.

While the invention has been described in conjunction with an example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, the image forming apparatus according to the present disclosure may not necessarily be limited to the color laser printer 1 but may be a monochrome laser printer. For another example, the image forming apparatus may not necessarily be limited to the single-functioned printer but may be a multifunction peripheral machine with a facsimile-communication function or may be a copier.

For another example, the second flat cable 62 may not necessarily be bent four times to shift from the side-by-side state aligning with the first flat cable 61 to the overlapping state, but the number of times to bend the second flat cable 62 may be two, six, or more, as long as the number is an even number. For another example, the flat cables to be bent is not necessarily be limited to the second flat cable 62 alone, but the first flat cable 61 alone may be bent, or both the first flat cable 61 and the second flat cable 62 may be bent. In the latter case, the number of times to bend the first flat cable 61 and the number of times to bend the second flat cable 62 may either be equal or the same.

For another example, in the embodiment described above, the electric devices to control the fuser are mounted on the high-voltage power board 21; however, the arrangement of the electric devices to control the fuser are not necessarily limited. For example, a fuser board on which the electric devices to control the fuser are mounted may be arranged on the rightward body frame 20 separately from the high-voltage power board 21, with the first flat cable 61 being connected to the high-voltage power board 21, and the second flat cable 62 being connected to the fuser board.

For another example, in the embodiment described above, the first flat cable 61 and the second flat cable 62 are provided with the ferrite cores 71, 72, respectively, but the quantity of the ferrite cores to be provided to each of the flat cables is not necessarily be limited but may be two or more. Optionally, a quantity of the ferrite core(s) provided to the first flat cable 61 and a quantity of the ferrite core(s) provided to the second flat cable 62 may be different.

For another example, the sponge 75 as an example of the distance-reserving member may be replaced with, for example, a rubber sheet of a foam sheet. In this arrangement, while the first flat cable 61 and the second flat cable 62 are flexible, it is preferable that the distance-reserving member also has flexibility.

What is claimed is:

1. An image forming apparatus, comprising:

paired main-body frames forming side walls of a main body that face each other;

a scanner frame, on which an exposure device for irradiating a photosensitive drum is mounted, the scanner frame being connected to one of the paired main-body frames and the other of the paired main-body frames at a position between the one of the paired main-body frames and the other of the paired main-body frames;

a scanner cover plate covering an entirety of the scanner frame on which the exposure device is mounted;

a first board arranged on the one of the paired main-body frames;

a second board arranged on the other of the paired main-body frames;

a first flat cable having flexibility, the first flat cable extending over the scanner cover plate and connecting the first board and the second board; and a second flat cable having flexibility, the second flat cable extending over the scanner cover plate and connecting the first board and the second board, wherein the first flat cable and the second flat cable are connected to the first board in a state overlapping each other in a thickness direction of the first flat cable and the second flat cable and connected to the second board in a state aligning side by side in a width direction of the first flat cable and the second flat cable, and a length, measured along a longitudinal direction of the first flat cable and the second flat cable, of a portion where the first flat cable and the second flat cable overlap each other is smaller than a length, measured along the longitudinal direction, of a portion where the first flat cable and the second flat cable align side by side.

2. The image forming apparatus according to claim 1, wherein the first flat cable and the second flat cable shift from the state overlapping each other to the state aligning side by side by at least one of the first flat cable or the second flat cable bending at least twice.

3. The image forming apparatus according to claim 1, further comprising a holder configured to retain the first flat cable and the second flat cable, wherein the scanner cover plate includes a plurality of engageable holes, the holder includes a plurality of engageable claws respectively engageable with the plurality of engageable holes, and the holder is fixed to the scanner cover plate by the plurality of engageable claws engaged with the plurality of engageable holes.

4. The image forming apparatus according to claim 1, further comprising at least two ferrite cores configured to cover a part of the first flat cable and a part of the second flat cable, respectively, wherein the at least two ferrite cores are located in the portion where the first flat cable and the second flat cable align side by side, at positions in proximity to the portion where the first flat cable and the second flat cable overlap each other.

5. The image forming apparatus according to claim 1, further comprising a sheet-shaped spacer interposed between the first flat cable and the second flat cable, the sheet-shaped spacer forming a predetermined amount of gap between the first flat cable and the second flat cable in the portion where the first flat cable and the second flat cable overlap each other.

* * * * *